(12) United States Patent
Bartels

(10) Patent No.: US 7,885,448 B2
(45) Date of Patent: *Feb. 8, 2011

(54) DIAGNOSTIC SCANNING MICROSCOPE FOR INFORMATION-ENRICHED QUALITATIVE HISTOPATHOLOGY

(75) Inventor: Peter H. Bartels, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 1017 days.

This patent is subject to a terminal disclaimer.

(21) Appl. No.: 11/711,284

(22) Filed: Feb. 27, 2007

(65) Prior Publication Data

US 2007/0177786 A1    Aug. 2, 2007

Related U.S. Application Data

(63) Continuation-in-part of application No. 10/637,486, filed on Aug. 11, 2003, now Pat. No. 7,184,610, and a continuation-in-part of application No. 10/602,756, filed on Jun. 24, 2003, now Pat. No. 7,343,033.

(60) Provisional application No. 60/276,498, filed on Mar. 19, 2001.

(51) Int. Cl.
*G06K 9/00* (2006.01)
*G21K 7/00* (2006.01)
*A61B 5/05* (2006.01)

(52) U.S. Cl. .......................... 382/133; 378/43; 600/427

(58) Field of Classification Search .................. 382/128, 382/129, 130, 131, 132, 133, 134, 162, 170; 600/411, 427; 378/43; 250/309, 311, 201.1; 128/902, 905; 436/63, 74, 164, 174, 519; 977/869, 881
See application file for complete search history.

(56) References Cited

U.S. PATENT DOCUMENTS

| | | | |
|---|---|---|---|
| 6,204,064 B1 * | 3/2001 | Alberts et al. | 436/63 |
| 6,396,941 B1 * | 5/2002 | Bacus et al. | 382/128 |
| 7,130,115 B2 * | 10/2006 | Olszak et al. | 359/372 |
| 7,346,200 B1 * | 3/2008 | Tsipouras et al. | 382/128 |

* cited by examiner

*Primary Examiner*—Abolfazl Tabatabai
(74) *Attorney, Agent, or Firm*—Antonio R. Durando

(57) ABSTRACT

A microscope array with staggered rows of magnifying imaging systems is used to scan a biological tissue sample in a single linear pass to produce an image and corresponding optical-density data. A conventional computerized algorithm is used to identify, isolate and produce segmented images of nuclei contained in the image. The OD values corresponding to nuclear chromatin are used to identify numerical patterns known to have statistical significance in relation to the health condition of the biological tissue. These patterns are analyzed to detect pre-neoplastic changes in histologically normal-appearing tissue that suggest a risk for the development of a pre-malignant and a potentially malignant lesion. This information is then converted to a visually perceptible form incorporated into the image of the tissue sample and is displayed for qualitative analysis by a pathologist.

22 Claims, 21 Drawing Sheets nuclear abnormality measure in endometrium

DIAGNOSTIC SCANNING MICROSCOPE FOR INFORMATION-ENRICHED QUALITATIVE HISTOPATHOLOGY

RELATED APPLICATIONS

This application is a continuation-in-part application of U.S. Ser. No. 10/637,486, filed Aug. 11, 2003 now U.S. Pat. No. 7,184,610 B2, which is based on PCT/US02/08286, filed Mar. 19, 2002, and claims the benefit of priority of U.S. Provisional Application No. 60/276,498, filed Mar. 19, 2001, under 35 U.S.C. Sect. 119, and is also a continuation-in-part application of U.S. Ser. No. 10/602,756, filed Jun. 24, 2003 now U.S. Pat. No. 7,343,033 B2.

BACKGROUND OF THE INVENTION

1. Field of the Invention

This invention is related in general to the field of light optical microscopy. In particular, it relates to a method and apparatus for conducting diagnostic testing of biological tissue with an array scanning microscope.

2. Description of the Related Art

Changes in the cellular structure of tissue are used to detect pathologic changes, to assess the progress of precancerous conditions, and to detect cancer. A tissue sample removed from a patient is typically sectioned and fixed to a slide for staining and microscopic examination by a pathologist. The morphology of the tissue (the visually perceptible structure and shape of features in the tissue) is analyzed to provide a qualitative assessment of its condition and to identify the presence of pathologic changes, such as may indicate progression towards a malignancy. For many decades, this visual procedure has been the diagnostic mainstay of pathology.

With the advent of computers and sophisticated digital imaging equipment, researchers have extended the realm of histopathology through the use of mechanized procedures for diagnostic and quantitative investigation. For example, U.S. Pat. No. 6,204,064 describes a method for measuring quantitatively the progression of a lesion toward malignancy by digitizing the images of clinical samples and analyzing nuclear chromatin texture features in the nuclei captured in the images. Numerical values are assigned to these features and compared to a monotonic progression curve previously established using the same criteria on known clinical samples ranging from normal to malignant tissue. Thus, the procedure provides a quantitative assessment of the condition of the tissue as well as a method for testing the efficacy of chemo-preventive drugs or therapeutic treatments.

In such mechanized procedures, histopathologic sections and/or cytologic preparations are imaged with a microscope and the images are digitized, stored, and analyzed for nuclear-placement patterns (histometry) or for the spatial and statistical distribution patterns of nuclear chromatin (karyometry). Karyometric assessment is always preceded by image segmentation, whereby each nucleus in an image is identified, outlined, isolated and stored as a separate image. For example, FIGS. 1 and 2 illustrate, respectively, the image of a histopathologic section and the enlarged image of a segmented nucleus and its chromatin pattern. As those skilled in the art readily understand, the nuclear chromatin pattern is an artifact of tissue fixation, but its spatial and statistical distributions are highly reproducible measures of the metabolic and functional state of cells. Thus, nuclear chromatin patterns have always been used in pathology to provide diagnostic clues. For example, the state of differentiation of the nucleus and its metabolic function may be reliably assessed based on a finding that nuclear chromatin is finely dispersed, coarsely aggregated, granular, clumped, or displaced toward the nuclear periphery.

Many chromatin texture features derived from the optical density of the tissue image have been identified as statistically significant for diagnostic purposes. Accordingly, after a sample is imaged and the image is digitized to provide an optical density value for each image pixel, the information is used in conventional manner first to identify and isolate each nucleus within the sample (image segmentation), and then to analyze chromatin patterns within each nucleus. The optical density recorded for each pixel is used to characterize chromatin features with statistical significance as parameters for identifying changes in the condition of the tissue. These features are then used much as alphabet letters can be used to identify features of a written text that are not readily perceptible by visual inspection. For example, the proportion of each letter appearing in a text, or the frequency of occurrence of certain letter diagrams, can be used to identify the language even though the text is not understood. Similarly, the spatial and statistical distribution of optical density in a nucleus can be used to detect chromatin patterns that are not visually perceptible. This notion provides a useful vehicle for achieving advantageous refinements in the detection of pathological change and of precancerous and cancerous lesions.

Optical density (OD) of a sample is defined in the art as the logarithm of the ratio of the light incident to the sample and the light transmitted through it. As used in microscopic imagery, optical density is usually expressed in terms of base-ten logarithmic values that range between zero and about 1.80 (because the accuracy of measurement limits near-zero transmission readings). An OD value of zero refers to full transmission, while an OD of 1.80 refers to transmission slightly greater than 1 percent. OD values are conventionally grouped into intervals of 0.10 OD units. For convenience, OD values may be multiplied by a factor of 100, so that computations can be carried out with integers (for example, an OD value of 1.0 is represented by 100, which corresponds to 10% light transmission).

As mentioned above, many features may be defined from the statistical and spatial distribution of nuclear chromatin. Global features are computed from the nucleus as a whole. For example, "total optical density" is defined as the sum of all pixel OD values in the nuclear area (i.e., the number of pixels within the outline of a nucleus). This feature is known to be related to the DNA ploidy of the nucleus, a measure of genetic instability and a diagnostic clue for progression toward a pre-malignant or malignant lesion. The variance of optical density within a nucleus is another example of global feature. Other features are local in nature, such as the frequency of occurrence of particular OD values within a certain interval, and have been identified in the art as indicative of tissue condition.

According to prior-art procedures, the chromatin features characterized using pixel OD values as described above have been reduced to number values representative of a quantitative measure of each feature and of a chromatin or nuclear "signature" representative of a set of features. These numeric values have then been used to provide pathologists with quantitative information available to complement their visual evaluation of tissue slides. For example, as generally described in U.S. Pat. No. 6,204,064, the information derived from the nuclear signature can be used advantageously as a quantitative measure of progression toward a lesion. That is, the physician is provided with information representative of a result formulated by the analytical algorithm built into the diagnostic system (e.g., a numerical value assigned to the nuclear signature calculated by the system and a resulting position in a progression curve). The physician is not provided with an image that has been information-enriched by the system and made available for visual inspection as an aid toward improved diagnostic evaluation. As a result, these prior-art mechanized procedures are often under-utilized by the profession. Moreover, the unique training and ability of pathologists to interpret visual imagery is not employed by the system.

Accordingly, there is still a need for a mechanized diagnostic system that provides information-enriched images of the tissue of interest in addition to the quantitative information generated by the analytical algorithm. Such a system would enable a pathologist to study histometric and karyometric features that are not visually detectable from the images acquired by the optical system but are rendered visible by the system's enhancing algorithms. Thus, significant chromatin features that might escape visual inspection become available for evaluation by the physician.

Obviously, the usefulness of any optical diagnostic technique is closely tied to the resolution of the imaging system because of the corresponding definition of chromatin patterns and the associated optical-density values. On the other hand, the image resolution of an optical objective is inversely related to its field of view. Therefore, any increase in resolution is accompanied by a corresponding loss of field of view, which greatly affects the system's capability for rapid imaging of useful-size tissue samples. Accordingly, in order to image a tissue sample with the degree of resolution required for cytopathological and histopathological testing, prior-art diagnostic imaging systems have relied on optics with high resolution and a small field of view, and on stitching techniques that yield a compound image from sequentially acquired images of adjacent portions of the tissue sample.

Typically, the field of view of a suitable microscope (such as a planapochromatic oil-immersion objective with NA 1.40 by Zeiss of Germany) is limited to about 200 microns. Related digital imaging systems enable sampling at six pixels per linear micron (36 pixels per square micron), as shown in FIG. 3, which results in several hundred to a few thousand pixels being recorded for each nucleus in the sample. Thus, tissue samples (up to about 50×25 mm in size) require multiple imaging steps and subsequent stitching of the resulting partial images of the sample. Because of the difficulty involved in aligning images of adjacent portions of the sample, the resulting composite images of overlapping features are often sufficiently misaligned to become reliable as a source of optical density information. The stage manipulation and the attendant time required to image an object under high magnification is particularly troublesome in pathology analysis because the diagnostic information in the tissue may be located in only a small portion of the tissue that is being imaged. In addition, the time for image acquisition is large enough to prevent analysis and/or data transmission in real time, which is becoming increasingly important in today's world of mechanization and shared information.

In view of the foregoing, there also remains a great need for a high-resolution imaging system capable of imaging an entire biological sample in a single scan. This invention is directed at a system that meets this requirement and provides information-enriched diagnostic images for direct visual analysis by practitioners.

BRIEF SUMMARY OF THE INVENTION

A recent innovation in the field of light microscopy provides a solution to the stitching problem associated with prior-art systems by using a miniaturized microscope array, also referred to herein as a multiple objective array microscope, or simply as an "array microscope." As described in commonly owned International Application PCT/US02/08286, herein incorporated by reference, each miniaturized microscope includes a plurality of optical elements individually positioned with respect to a corresponding image plane and configured to image respective sections of the sample. The array further includes a plurality of image sensors corresponding to respective optical elements and configured to capture image signals from respective portions of the sample.

In such an array microscope, a linear array of miniaturized microscopes is preferably provided with adjacent fields of view that span across a first dimension of the sample (also referred to herein as y direction), and the sample is translated past the fields of view across a second dimension (x direction) to image the entire sample. Because the diameter of each miniaturized microscope objective is larger than its field of view (having respective diameters of about 2 mm and 250 µm, for example), the individual microscopes of the imaging array are staggered so that their relatively smaller fields of view are offset over the second dimension (the direction of scanning) but aligned over the first dimension, as illustrated in FIG. 4. As a result of the staggered arrangement of the rows of lenses, the continuous strip covered by the linear scan of each optical system is substantially free of overlap with continuous strips covered by adjacent optical systems. At each acquisition frame each microscope projects the image of a small section of the sample object directly onto a detector and the individual images are then combined to form a composite image of the entire object by hardware or software manipulation. Thus, the detector array provides an effectively continuous linear coverage along the first dimension which eliminates the need for mechanical translation of the microscope in that direction, providing a highly advantageous increase in imaging speed by permitting complete coverage of the sample surface with a single scanning pass along the second dimension. The details of implementation of array microscopes are disclosed in copending U.S. Ser. No. 10/637,486.

Thus, according to the present invention, a biological tissue sample is scanned in a single pass to produce an image of the sample and corresponding optical-density data for each pixel in the image. These data are analyzed in conventional manner using a computerized algorithm to identify, isolate and produce segmented images of nuclei contained in the image of the sample. The OD values corresponding to nuclear chromatin are used to generate and identify numerical patterns known to have statistical significance in relation to the health condition of the biological tissue being tested. These patterns are analyzed to detect, for example, pre-neoplastic changes in histologically normal-appearing tissue that suggest a risk for the development of a pre-malignant and eventually a malignant lesion. Then, in a novel form of utilization of these numerically derived patterns, this information is converted to a visually perceptible form incorporated into the image of the tissue sample and is displayed for qualitative analysis by a pathologist. Thus, an information-enriched image is produced that displays features previously present but not visually detectable by human observation. In addition, the same or other numerically derived patterns may be used to quantify a property of the sample and produce a quantitative diagnostic result associated with that property.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The invention is based on the realization that prior-art advances made in the field of optical histopathology have not been properly utilized to optimize the detection of lesions and other forms of tissue abnormalities. In particular, mechanized prior-art procedures have provided quantitative measurements of tissue abnormalities related of chromatin patterns in the nuclei of cells, but these procedures do not provide this information to the pathologist in a form that takes advantage of his or her highly specialized training in interpreting visual information during the diagnostic process. The numerically derived patterns corresponding to significant chromatin features have been used to provide a quantitative analysis that supplements the pathologist's visual interpretation of the tissue image, but these numerical data have not been used to provide the pathologist additional information for his or her qualitative, visual assessment of the tissue. That is the improvement provided by the present invention.

As used herein, the term "pixel" refers both to the discrete portion of a light detector associated with a signal corresponding to light received thereby and to the corresponding area of the sample from which the light is received. The term "microscope" is used not only in its generic sense but also with reference to both the array microscope and the individual miniaturized microscopes within the array described in International Application PCT/US02/08286, and it is assumed that the distinction will be apparent to those skilled in the art from the context of the description. With reference to the scanning direction of the imaging system of the invention, as claimed, the term "linear" is intended to cover a straight as well as a curvilinear path during which each objective of the microscope array acquires image data (light intensity) corresponding to a respective straight or curvilinear continuous strip of the object.

Figure 1:
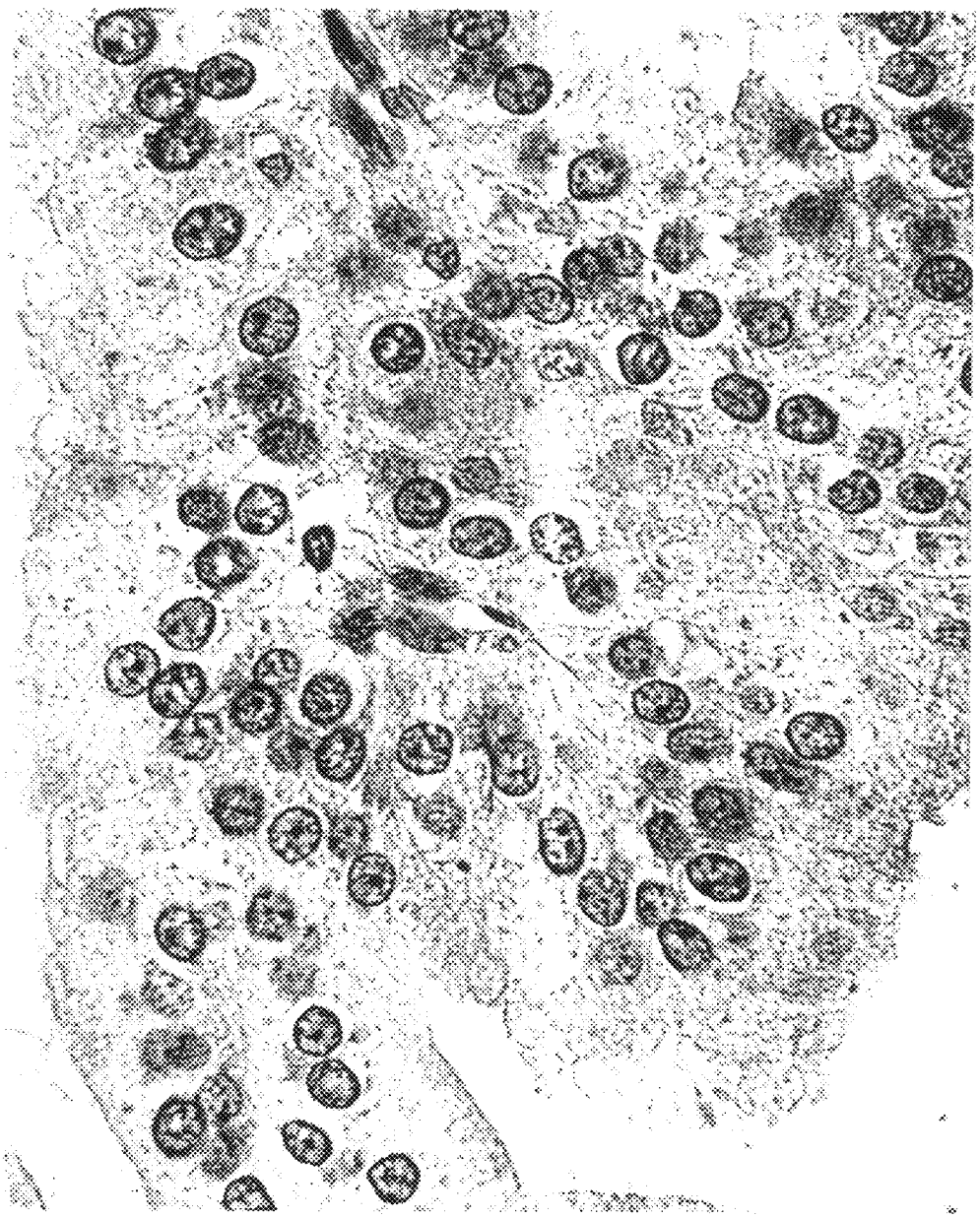
FIG. 1 is an image of a histopathologic section viewed under 600× magnification.
Figure 2:
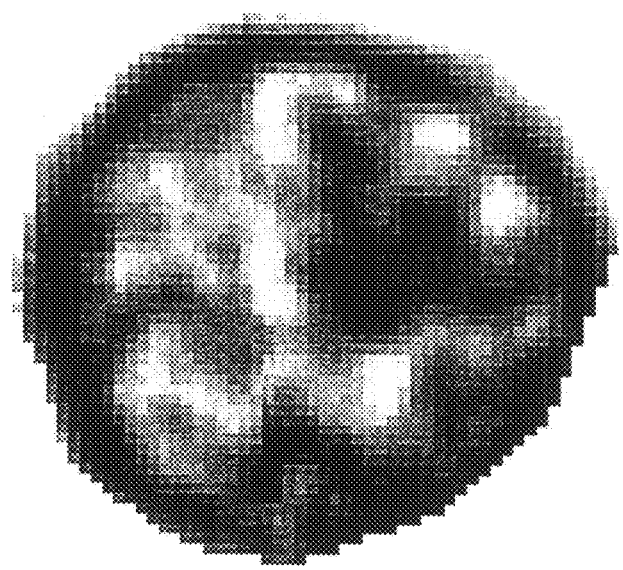
FIG. 2 is the segmented image of a single nucleus in the section of FIG. 1, wherein the image is further magnified to illustrate chromatin patterns and the effect of pixellation.
Figure 3:
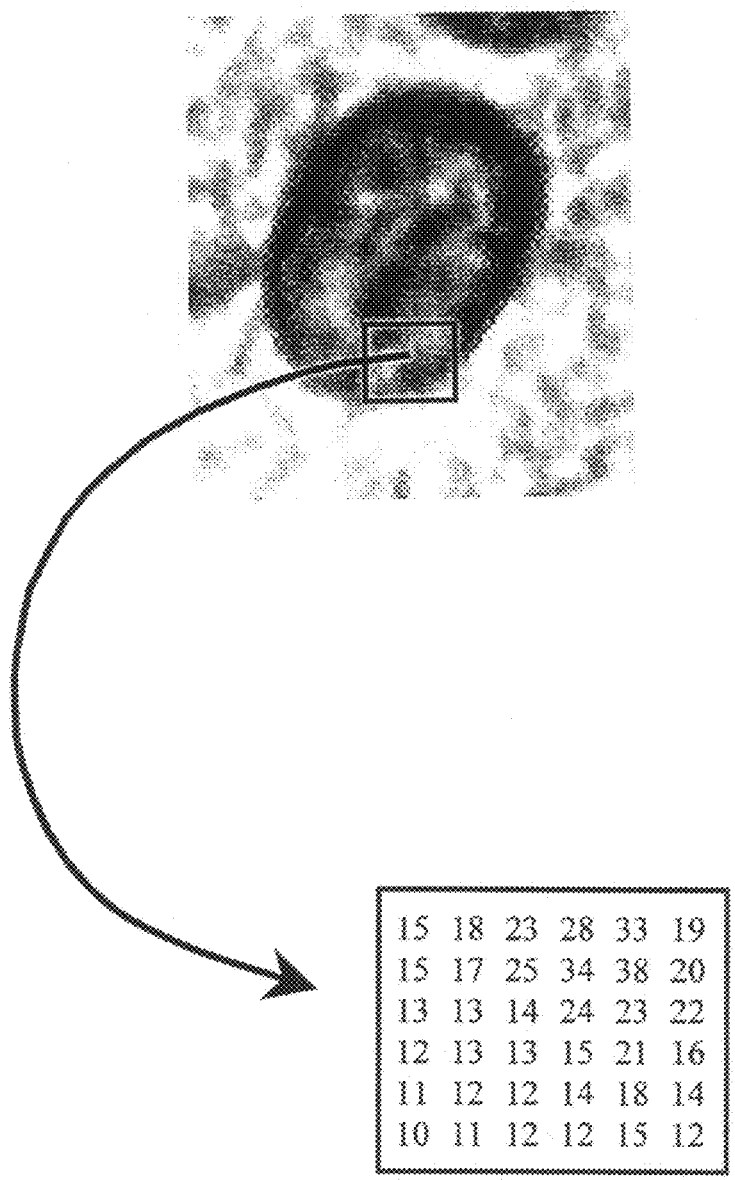
FIG. 3 illustrates the image area corresponding to one square micron of sample surface and typical optical-density numerical data corresponding to that portion of the image.
Figure 4:
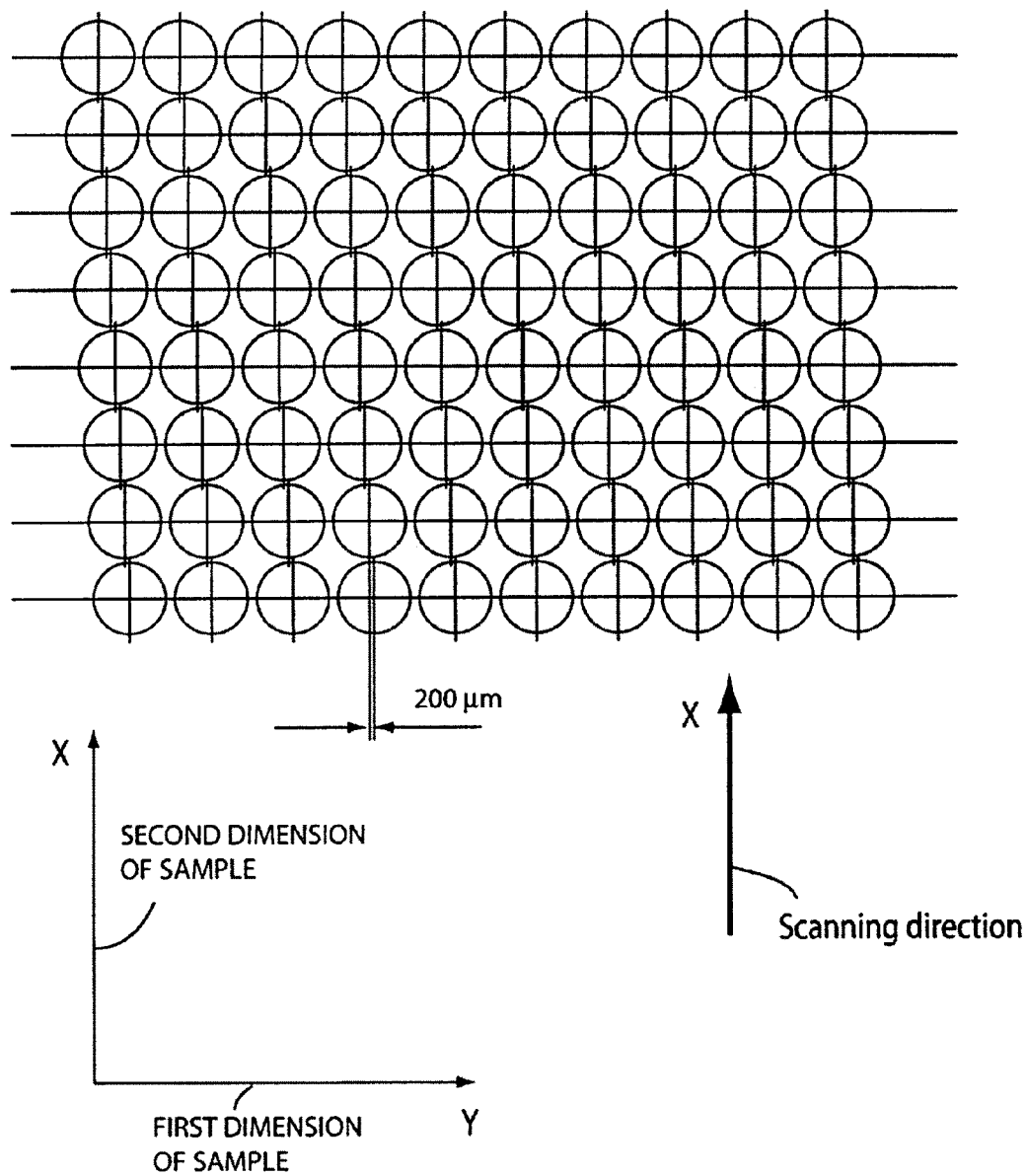
FIG. 4 is a simplified schematic representation of the fields of view in an array-microscope layout of 99 miniaturized microscopes in an array of 9 rows of individual microscopes disposed transversely and 11 columns of microscopes disposed at a slight angle, respectively, with respect to the direction of scanning, such that a complete coverage of the sample surface is achieved during a scan.
Figure 5:
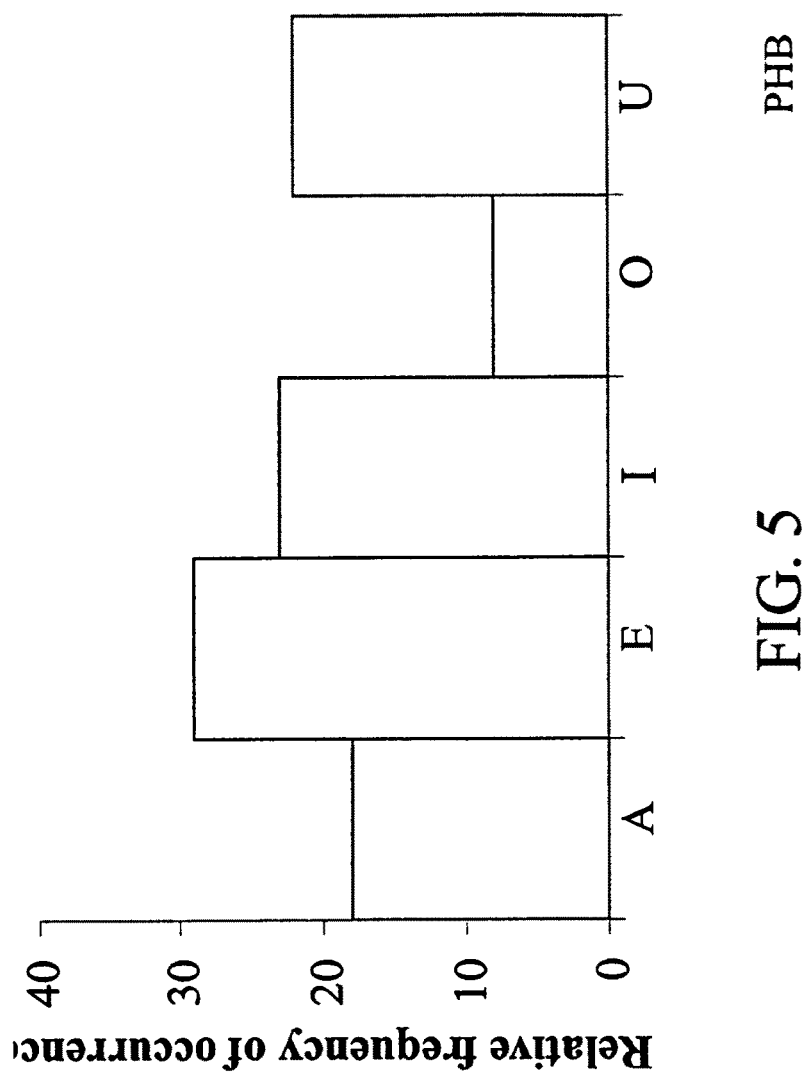
FIG. 5 is a histogram of the relative frequency of occurrence of the vowels in a page of Latin text from Julius Caesar's De Bello Civili.

In order to appreciate the subtlety of the present invention, it is useful to point out the distinction between the concepts of visual-image, information and non-visual image information. For example, when one reads a printed text, each letter, word, and the language of the text (if known) are readily recognized. Each conveys visually perceived information. On the other hand, most people could not recognize the frequency of occurrence of a given letter, of a given diagram of letters, or of a given sequence of letters. Yet, each of these conveys statistically significant non-visual information that can be utilized to characterize features of the text. For instance, vowels are known to occur with different frequencies of occurrence in different languages. Therefore, a histogram of the relative frequency of occurrence of each vowel, as illustrated in FIG. 5, could be used by a linguist to identify the language or, for example, to place it within an evolutionary scale of related languages. Thus, it is clear that even information that is not readily perceived by visual inspection (referred to herein as "non-visual" information) can be converted into visually perceived information, such as the histogram of FIG. 5, which provides additional knowledge that is significant and can be used advantageously by experts in the field of linguistics. For instance, if the vowel "a" in a given text occurs at the frequency expected for a certain language, it may be printed in green. If it occurs at an increased frequency, say twice the expected rate, it may be printed in red.

Another example lies in the field of music. When played, music provides audibly perceptible patterns as well as hidden statistical dependencies in the sound pattern that escape recognition even by the most sophisticated listener. Yet these undetected sound patterns may carry information that, if identified in the form of statistically significant data, could greatly enhance the process of studying and analyzing musical structure. For instance, non-audibly detectable patterns may be identified in terms of numerical values based on signals contained in a digital recording, isolated from the recording, and, for evaluation by an analyst, they may be converted into music notes if the analyst is particularly skilled at perceiving audible information. They could also be converted into color in the printed musical scores. This information could be used by musicologists to study the original musical composition to further refine their understanding of its structure. For example, such a process could be used to aid in the identification of the author of a newly discovered score by comparing numerically derived patterns identified in the score with the same patterns found in the music of known authors. Thus, again, information that is not directly detectable by an expert can be identified by a machine using numerically derived, statistically significant patterns. The same information can then be converted to a detectable form that an expert in the field can analyze and take into account in a qualitative analysis of the original work.

Figure 6:
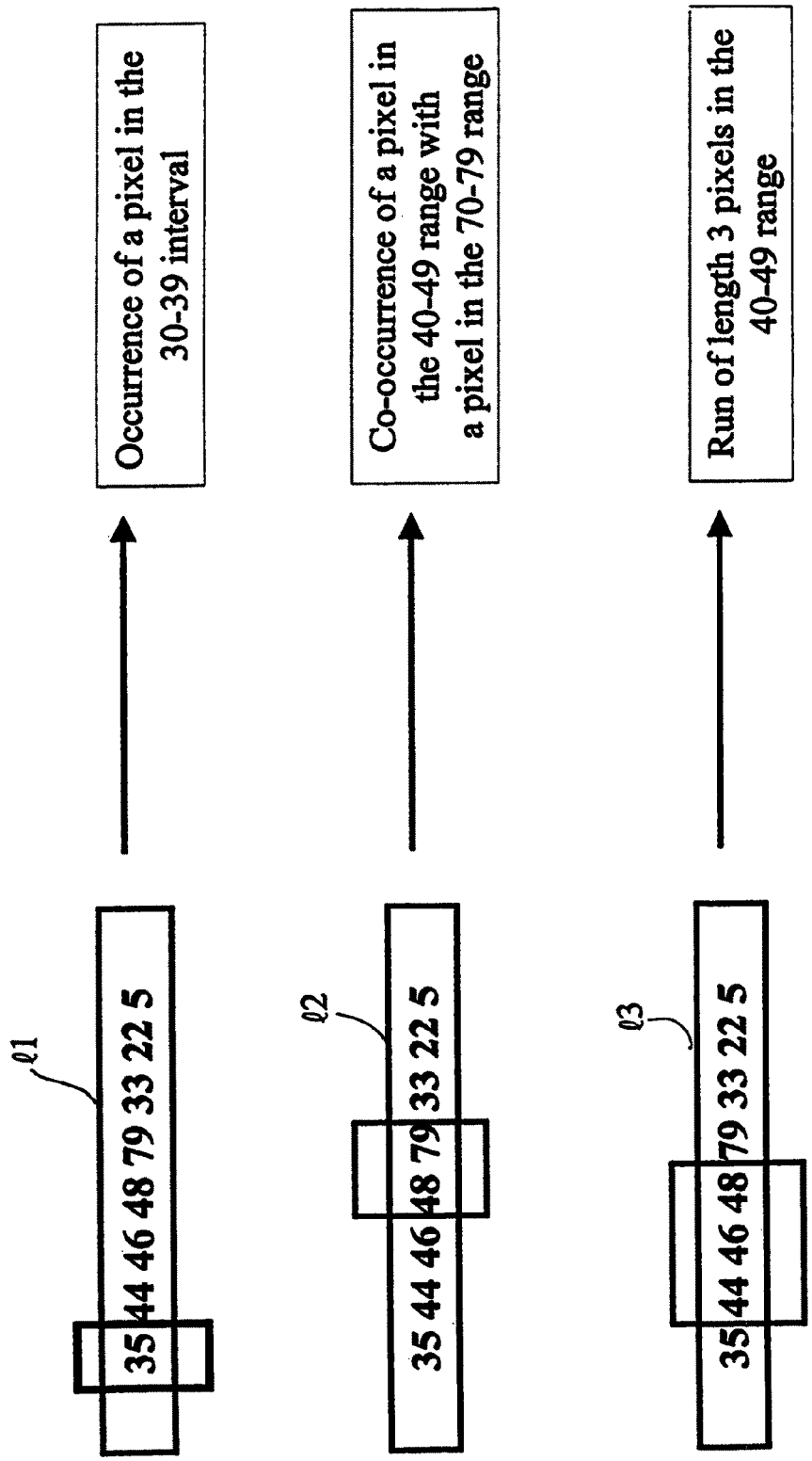
FIG. 6 is an example of optical-density values acquired during a microscopic scan of a tissue sample and representing a given statistical pattern, such as the occurrence of certain OD values in a given interval, the occurrence of values in certain OD ranges in adjacent pixels, and the occurrence of a run of three values in the same interval in three adjacent pixels.
Figures 7, 8:
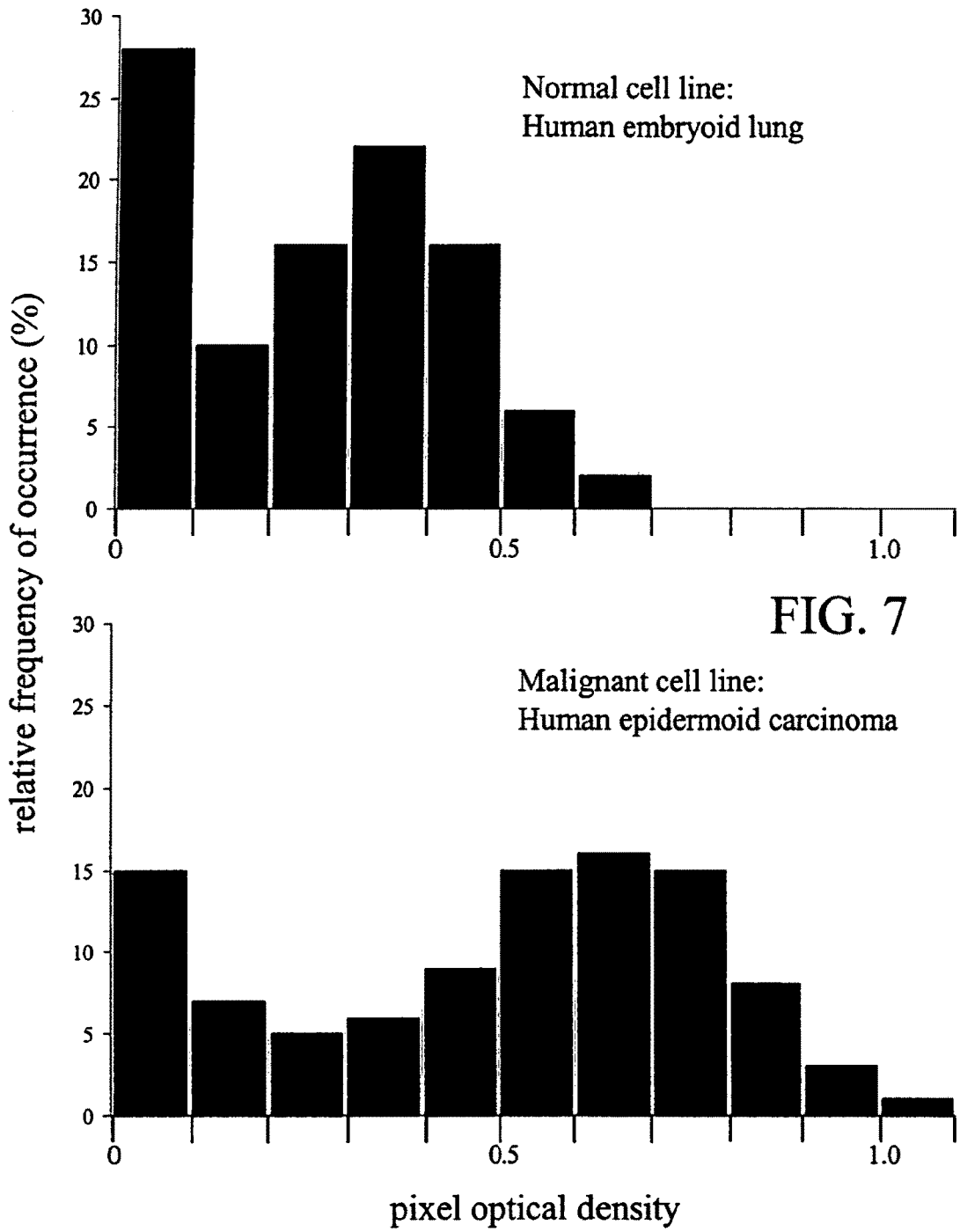
FIG. 7 is the histogram of the relative frequency of occurrence of OD values within each 10-unit interval of the standard 0.0-1.8 OD-unit range for a normal cell line.
FIG. 8 is the histogram of the relative frequency of occurrence of OD values within each 10-unit interval of the standard 0.0-1.8 OD-unit range for a malignant cell.

With reference to histopathology, FIG. 6 provides an example of how optical-density values may be used according to the invention. Each line 11-13 represents a pixel sequence of OD values (scaled by 100) acquired during a microscopic scan of a tissue sample. Each value corresponds to a pixel within the area of a nucleus in the image and reflects the optical density imparted by the chromatin in that pixel. The first line 11 illustrates the occurrence of scaled OD values in the 36-39 interval; the second line 12 illustrates the occurrence of values in the 40-49 and 70-79 ranges in adjacent pixels; and the third line 13 illustrates the occurrence of a run of three values in the 40-49 range in three adjacent pixels. Applied to the entire nuclear region, each of these variables provides a useful analytical tool for characterizing the state of a cell. For example, FIGS. 7 and 8 show the difference between the histograms of the relative frequency of occurrence of OD values within each 10-unit interval for normal and malignant cell lines, respectively. The figures show that the optical density of malignant cells is skewed toward higher values in a statistically significant manner that reflects the existence of dense chromatin granules associated with malignancy. Thus, this is an OD feature that provides useful patterns to identify and quantify the progression of a lesion, as disclosed in U.S. Pat. No. 6,204,064.

Many other OD features have been used in the art to identify useful patterns for diagnostic applications. For example, other first-order statistical variables may consist of how often consecutive OD values in a line of pixels fall within a certain interval. Higher-order statistical variables may similarly be used, such as the slopes of OD values between adjacent pixels. Finally, additional specific features have been utilized to summarize statistical properties, such as run-length uniformity or non-uniformity, OD lumpiness, shape of the OD histogram, and other descriptive features. These features have been used in the art in various manners in order to produce a nuclear signature that, when compared to the nuclear signature of a normal tissue, provides a quantitative assessment of the condition of the tissue. See, for example, P. H. Bartels et al., "Extraction and evaluation of information from digitized cell images," Mammalian cells: probes and problems, Richmond et al. ed., Oak Ridge, Tenn., Technical Information Center, 1975:15-28; T. Young et al., "Characterization of chromatin distributions in cell nuclei," Cytometry 1986, 7:467-474; E. Bengtsson et al., "Densitometry, Morphometry and Texture Analysis as Tools in Quantitative Cytometry and Automated Cancer Screening," Grohs and Husain OAN, editors, 1994. p. 21-43; and A. Doudkine et al., "Nuclear texture measurements in image cytometry," Pathologica 1995, 87:286-299.

According to the present invention, any number of these same features is used instead to provide a visually perceptible representation of otherwise undetectable information. Because of its visible form, this information is made available to the pathologist for a qualitative assessment of the tissue to be used in addition to the images provided in normal practice. For example, the sum of the optical density within the nucleus of the cells in a given tissue sample may be measured as a variable indicative of the presence or absence of a lesion based on a statistical comparison with normal and malignant cells. This information may then be used to provide an information-enriched image by adding a color to each nucleus indicative of its true condition based on the statistical analysis.

Figure 9:
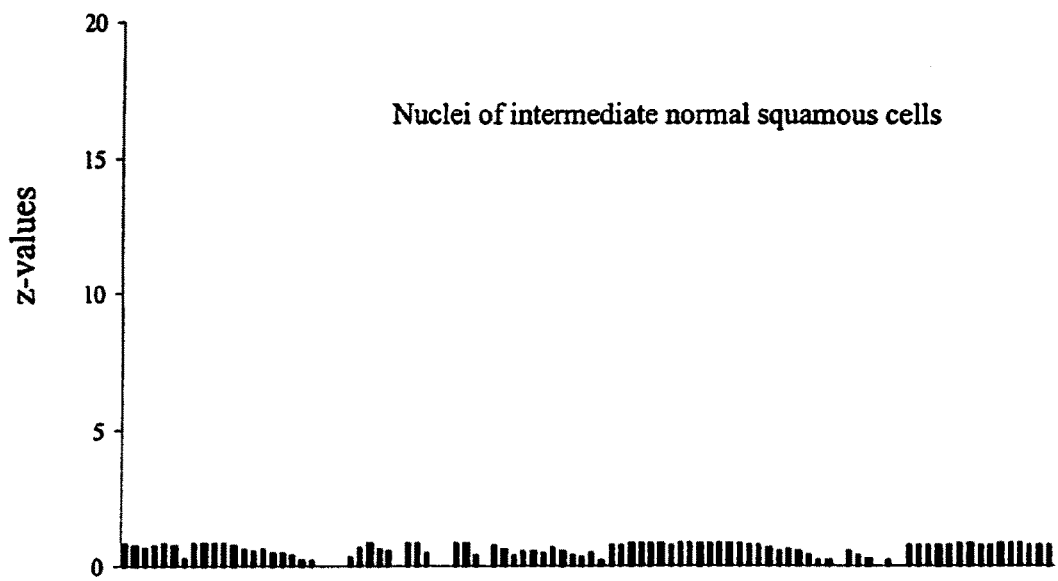
FIG. 9 illustrates a nuclear signature for normal tissue derived from 93 features of normal ectocervical squamous cells.

In practice, a plurality of OD features is normally selected for analysis and is ordered in an arbitrary (but consistently maintained to allow comparison) predetermined sequence. To form a nuclear signature, a set of reference nuclei from normal tissue of a given organ site is used. The mean and the standard deviation in the reference cells are computed for each of the plurality of selected features. For any nucleus in the data set to be analyzed, the absolute difference to the mean in the reference data set is computed for each feature and is "normalized" by dividing it by the standard deviation found in the reference data set for that feature. In other words, the feature values are expressed in terms of so-called z-values (that is, in units of standard deviation, also referred to in the art as z-scores). Thus, the reference data set will produce a z-value for each feature that depends on the shape of the probability function for that feature. FIG. 9 illustrates such a nuclear signature for normal tissue derived from 93 features of normal squamous-cell tissue. For a Gaussian, symmetrically distributed feature, the z-value will be 0.67; that is, a little less than one standard deviation and a value for which 50% of all nuclei have a lower, and 50% a higher, deviation. For skewed distributions, it may be higher or lower, as seen for some features in FIG. 9.

Figure 10:
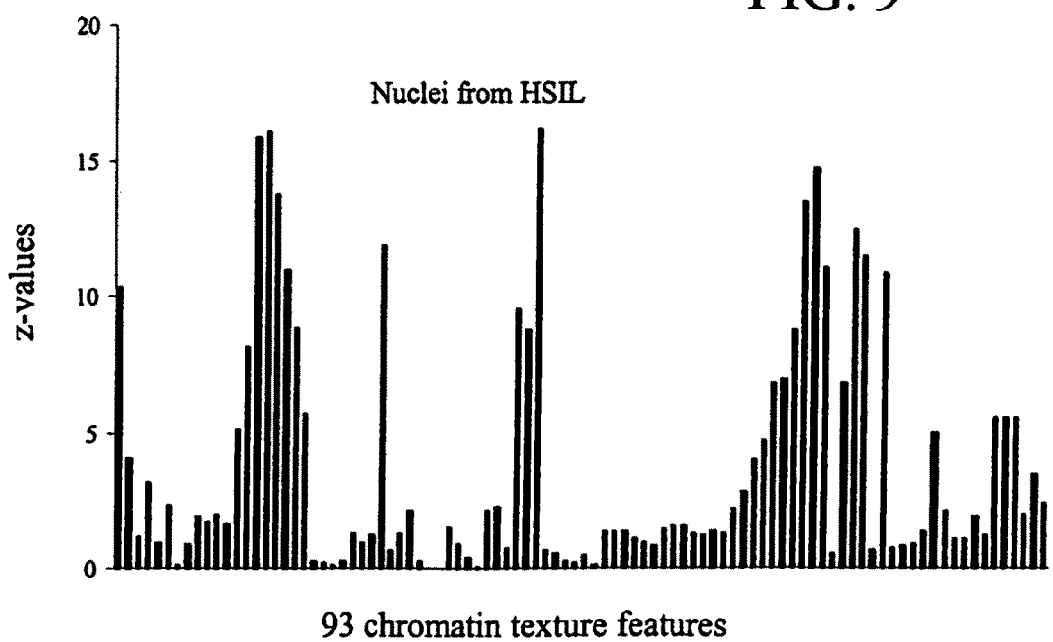
FIG. 10 illustrates a nuclear signature for a lesion derived from 93 features of cells from HSIL (high grade squamous intraepithelial lesion) of the ectocervix.
Figure 11:
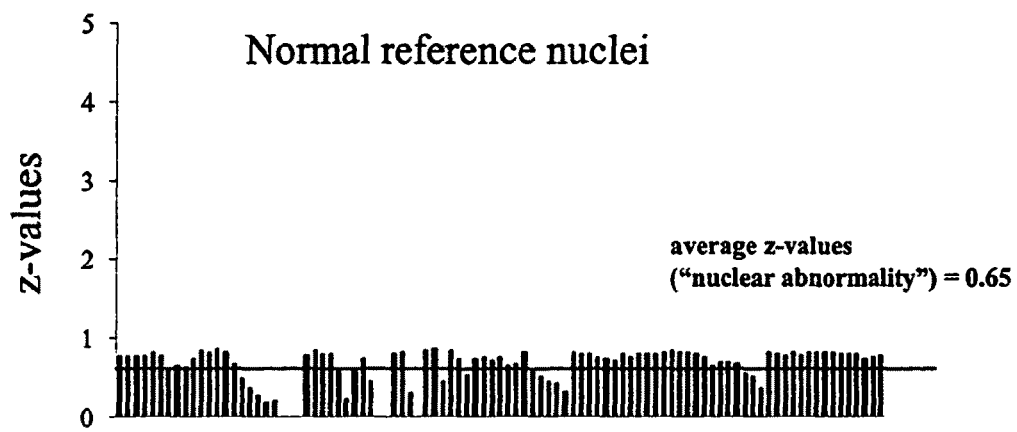
FIG. 11 illustrates the nuclear abnormality assessment of normal cells, shown as the average z-value of all nuclear features measured in normal cells.
Figure 12:
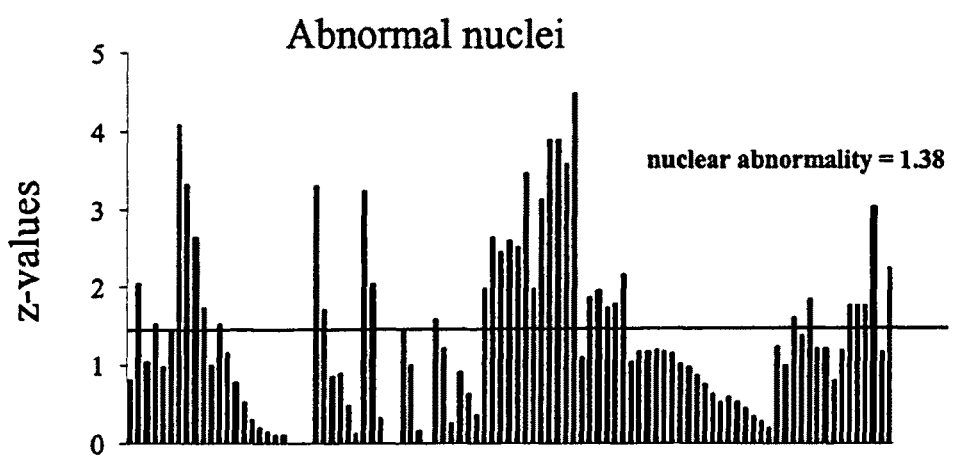
FIG. 12 illustrates the nuclear abnormality of cells from a lesion, shown as the average z-value of all nuclear features measured in the abnormal cells.

Repeating the same statistical exercise with the same 93 OD features using data obtained from nuclei from a known lesion, a clearly distinct profile is obtained, as shown in FIG. 10, which illustrates the usefulness of these features in assessing the pathologic condition of cells. In order to reduce the dimensionality of the nuclear-signature representation, an average of the z-values over all features may be used instead of the entire profile. Thus, a single number for each nucleus is obtained that describes the average deviation of the nuclear features from normal, referred to herein as the "nuclear abnormality." FIGS. 11 and 12 illustrate the results of such an averaging process. If a histogram is constructed to reflect the nuclear abnormality of each measured nucleus in a sample, the resulting distribution is referred to as a "lesion signature."

Figure 13:
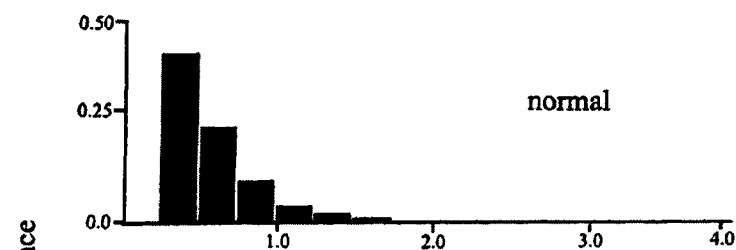
FIG. 13 illustrates the lesion signature of normal endometrial tissue.
Figure 14:
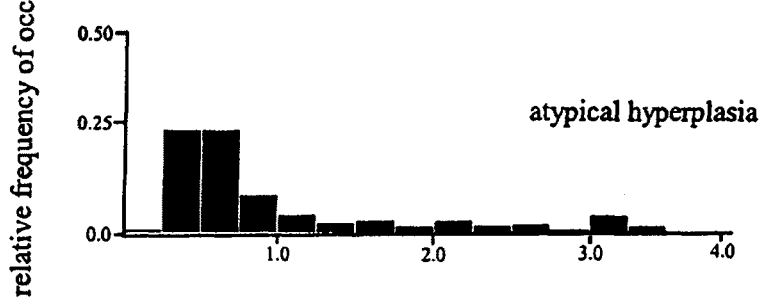
FIG. 14 illustrates the lesion signature of endometrial tissue with atypical hyperplasia.
Figure 15:
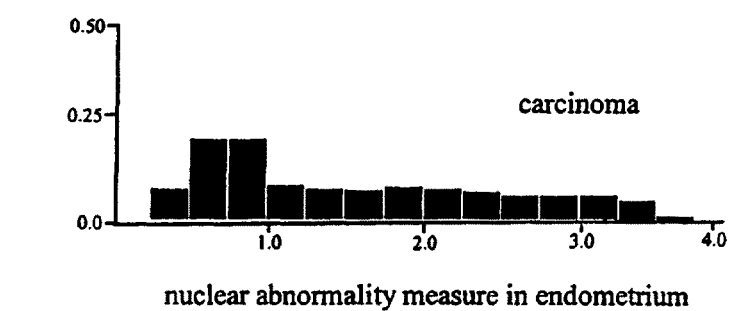
FIG. 15 illustrates the lesion signature of endometrial tissue with carcinoma.

FIG. 13 illustrates the lesion signature of normal endometrial tissue. Most cells exhibit a nuclear abnormality in the lower, normal value range (see FIG. 11); very few cells show a nuclear-abnormality value above 1.0; and none have a value above 2.0. In contrast, tissues with lesions show progressively different lesion signatures with more cells with high nuclear abnormality and fewer cells with normal nuclear abnormality. FIG. 14 illustrates the lesion signature of a tissue sample with atypical hyperplasia, showing a significant incidence of nuclear abnormality values above 2.0 and a reduced number of normal values. FIG. 15 illustrates the lesion signature of a tissue with carcinoma, wherein the nuclear abnormality is seen spread through a wide range of higher values.

An important aspect of the invention lies in the recognition that these differences in OD features appear not only in cells that produce visually recognizable image features (that is, features that the average pathologist identifies visually as significant for a diagnosis), but they appear also in apparently healthy tissue. Accordingly, the invention is particularly useful in the detection of such pre-neoplastic changes in histologically normal-appearing tissue that suggest a risk for the development of a pre-malignant and a potentially malignant lesion. It has also been shown in some organ sites that the degree of pre-neoplastic change corresponds to the grade (an established measure of progression) of existing lesions at different locations in the same organ. Thus, the detection of pre-malignant change in a biopsy taken from tissue that appears histologically normal to the human eye may point to the presence of an existing pre-malignant or malignant lesion in the same organ, or it may suggest a risk for the recurrence of a lesion removed by an earlier intervention. It has also been shown that nuclear-abnormality values in breast lesions are highly correlated with risk values accepted by pathologists for the development of infiltrating disease.

Figure 16:
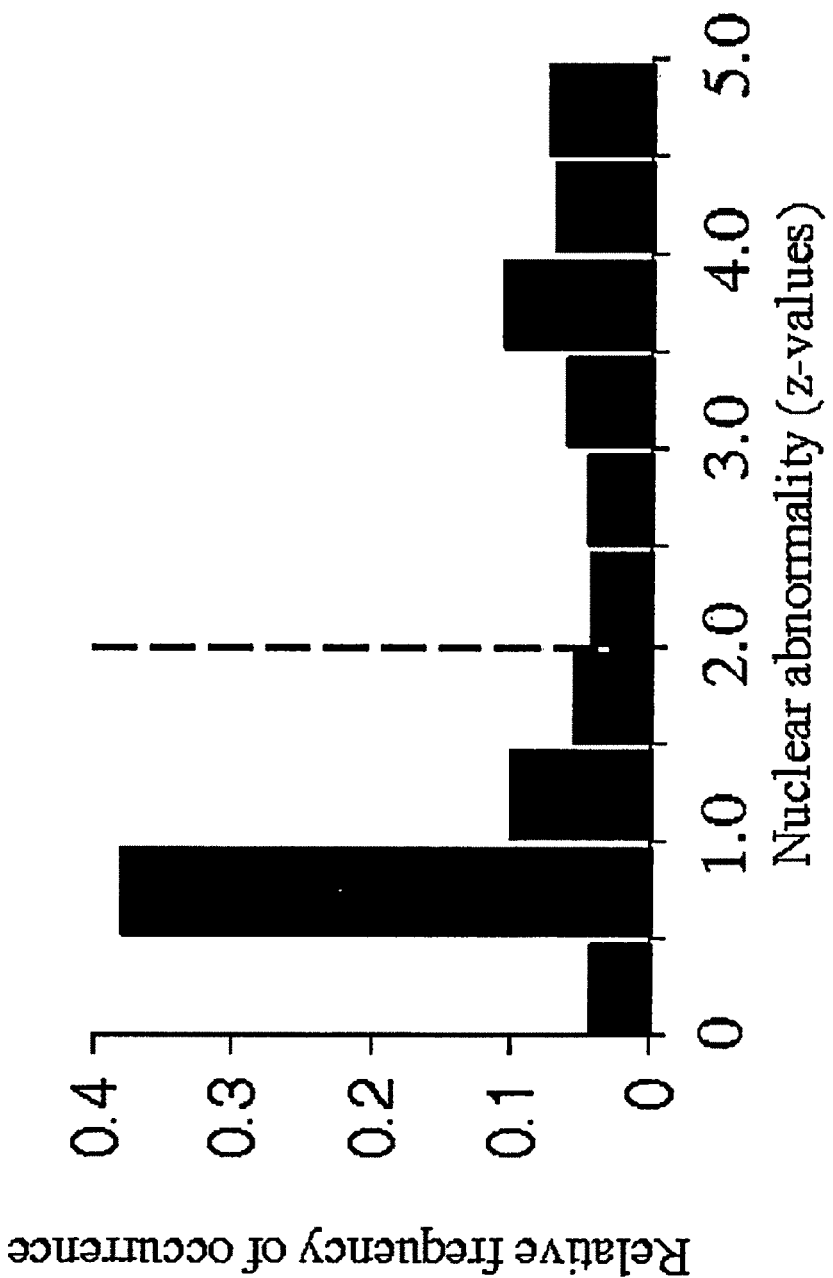
FIG. 16 shows a bimodal nuclear-abnormality distribution of histologically normal tissue from rectal mucosa from patients with a prior history of colonic adenoma.

Thus, in general and according to the invention, a decision rule may be derived from cases of known outcome and then used to assign a risk value to new cases. For example, a data set of normal tissue for a given organ of interest is established and then nuclear signatures for a large number of nuclei from cases of known outcome are determined, as explained above. The distribution of nuclear-abnormality values is then computed for the entire set of nuclei. For instance, FIG. 16 shows the nuclear-abnormality distribution of histologically normal rectal mucosa from patients with a prior history of colonic adenoma (a known potential precursor lesion for colonic adenocarcinoma). It is evident from the figure that the nuclei fall into two distinct modes, one with moderate deviation and the other with marked deviation from normal. Thus, as illustrated in the figure, an arbitrary but judiciously selected threshold T may be used to separate the two modes at a deviation from normal, for example, equal to two feature-averaged standard deviations.

Figure 17:
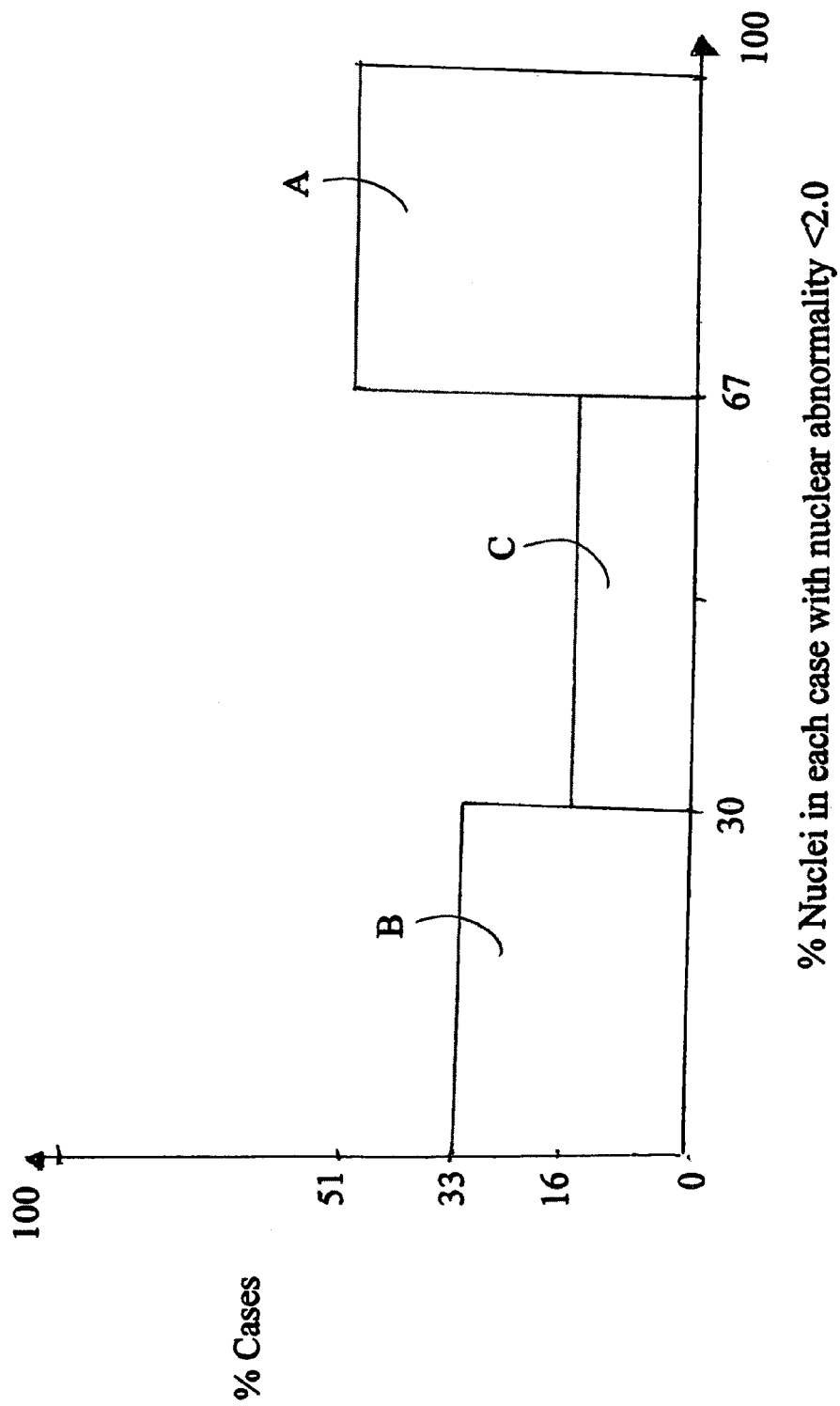
FIG. 17 is a plot showing the percentage of the cases corresponding to the distribution of FIG. 16 having a percentage of nuclei within different groups (0-30%; 31-60%; 61-100%) with nuclear abnormality less than 2.0.

FIG. 16 clearly shows that the images of cells that appear normal to visual inspection carry visually undetectable information that can be used according to the invention to reveal otherwise undetected abnormalities. To that end, the data corresponding to FIG. 16 are further utilized to calculate the proportion of nuclei in each case that fall into one or the other deviation mode (i.e., below or above the threshold of 2.0). FIG. 17 illustrates such a plot with reference to the cases used for FIG. 16. As would be clear to one skilled in the art, the cases with the highest proportion of nuclei in the group below the threshold represent the most normal cases. On the other hand, the cases with a small percentage of nuclei below the threshold represent cases with greater deviation from normal. FIG. 17, for example, shows 51 percent of the reference cases having at least 67 percent of their nuclei with moderate deviation from normal (i.e., less that 2.0 nuclear abnormality), illustrated by area A; 33 percent of the cases have only 0-30 percent of their nuclei in the same range (area B); and the remaining 16 percent of cases have between 30 and 67 percent of their nuclei in the moderate deviation range (area C).

The statistical significance of this difference may be further refined by applying a nonparametric test to the two subsets of data at each end of the nuclear abnormality plot. For example, a Kruskal Wallis test may be conducted in conventional manner to determine which of the OD features (93 were used in the example) are statistically different between the two data subsets at a certain significance level, and to distinguish cases with moderate and high deviation from normal. For instance, features from different feature groups may be selected from among the features testing at a p-level of 0.005 or less. Using a standard stepwise discriminant algorithm, the mean discriminant function score is computed for each case over all of its nuclei. These scores are then plotted as a function of the corresponding average nuclear abnormality for each case, as illustrated in the plot of FIG. 18, which also shows the 95-percent confidence-level ellipses for the bivariate mean vectors and the 90-percent tolerance ellipses for case mean values.

Figure 18:
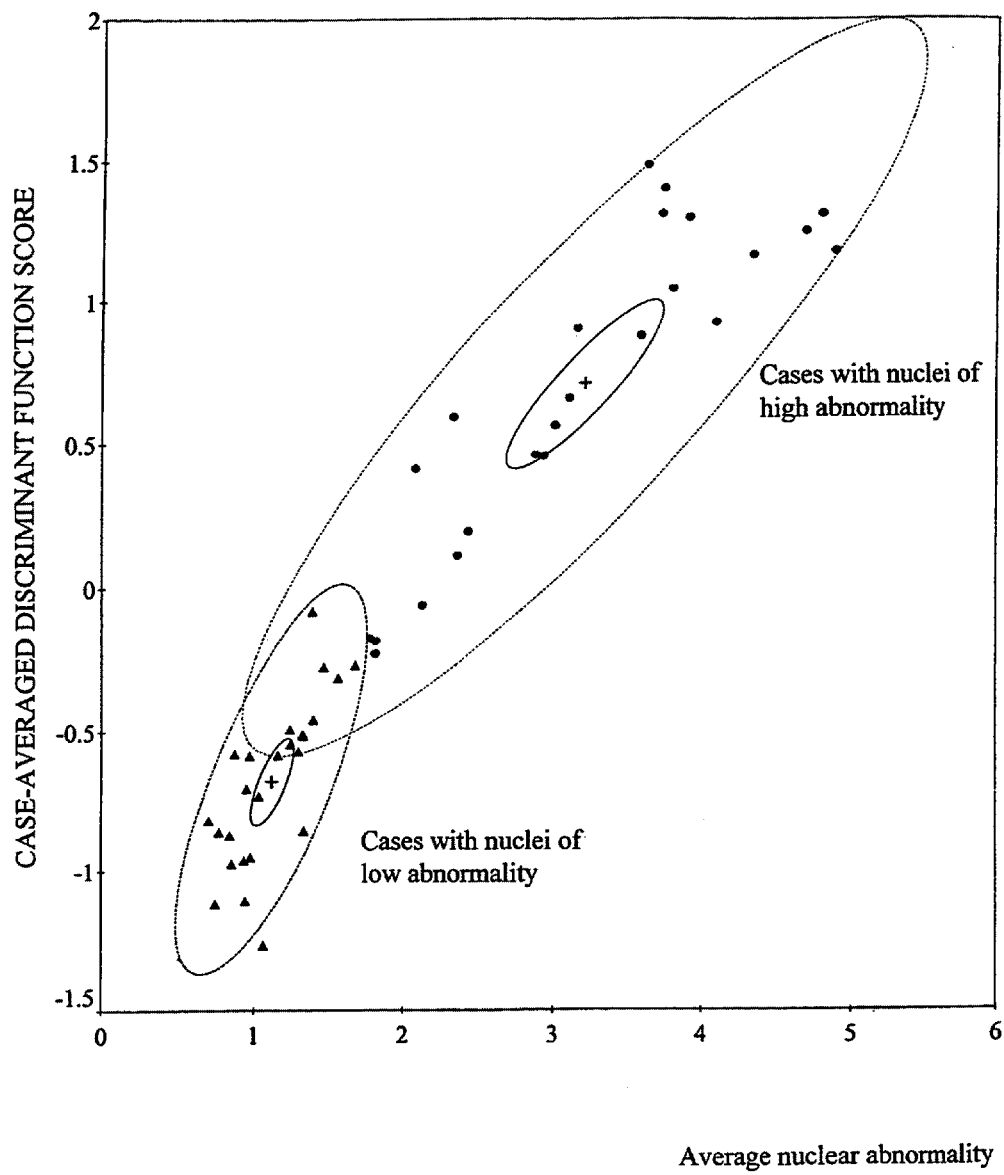
FIG. 18 is a plot of case mean discriminant function scores versus average nuclear abnormality for each case. The cases fall into two groups, with lower abnormality and higher abnormality (on the upper right), which has prognostic relevance and suggests relative risk.
Figure 19:
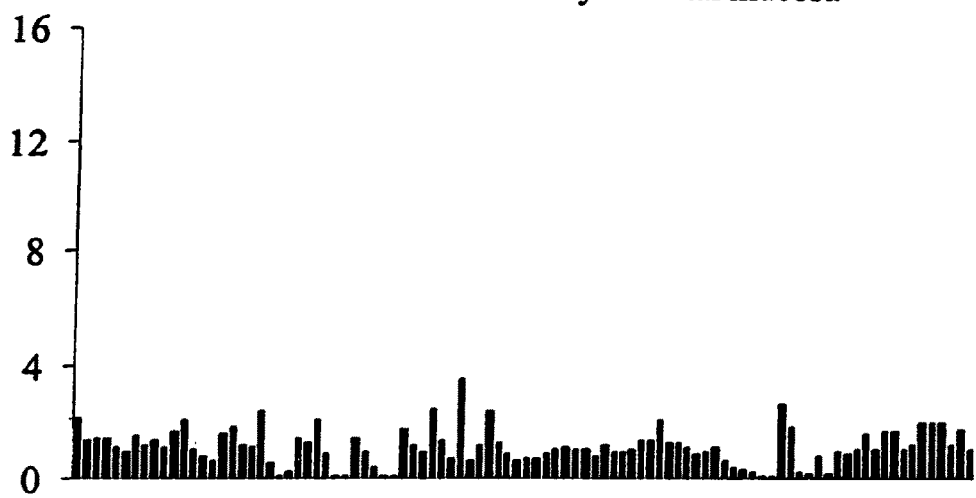
FIG. 19 illustrates the nuclear signature of the cases in the lower risk groups in FIG. 18.
Figure 20:
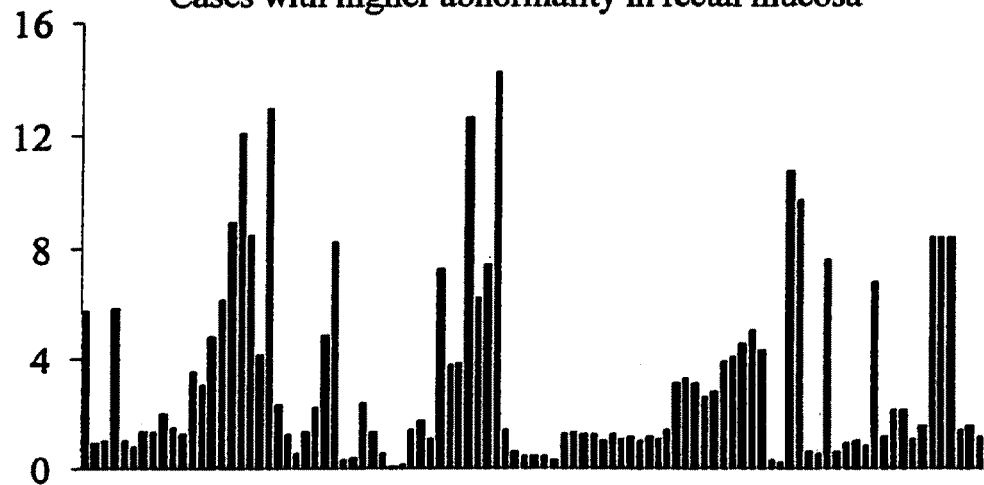
FIG. 20 illustrates the nuclear signature of the cases in the higher risk groups in FIG. 18.
Figure 21:
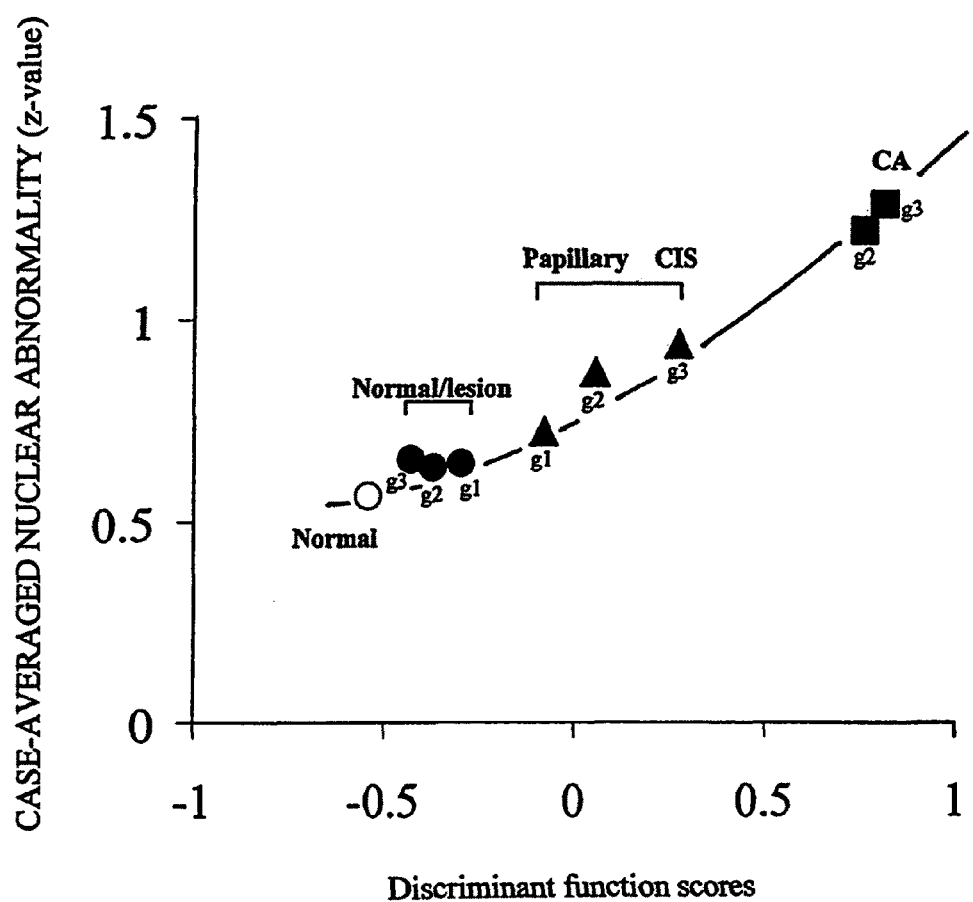
FIG. 21 is an example showing the position of nuclei in histologically normal-appearing tissue that in fact exhibits pre-neoplastic changes on a progression curve for bladder cancer varying between normal and papillary carcinoma in situ of grade 1 lesions (normal/lesion $g_1$, $g_2$, and $g_3$). The symbols $g_1$, $g_2$ and $g_3$ indicate nuclei measured in histologically normal-appearing tissue from cases of bladder cancer of grades 1, 2 and 3, respectively.

The location of a data point representing a case in the plot of FIG. 18 indicates the degree of pre-neoplastic change in the tissue. Similarly, FIGS. 19 and 20 show the distinctly different nuclear signatures of the cases in the lower and higher risk groups in FIG. 18. Thus, the grade of a coexisting pre-malignant or malignant lesion and/or the associated risk of possible recurrence of a pre-malignant lesion may be assessed by the procedure. It is noted that the deviation from normal in cases with pre-neoplastic change is not necessarily expressed in every nucleus. Further processing of the data sets with a non-supervised learning algorithm (P-index) may show that the data set with an average deviation between normal and a low-grade premalignant or malignant lesion actually consists of two subsets. For example, one may be formed by nuclei almost indistinguishable from normal, whereas the other is practically indistinguishable from low-grade malignant nuclei. When present in only 25 to 50 percent of the nuclei in seemingly histologically normal tissue, these deviant cells are not detected by visual assessment but nonetheless exhibit a nuclear abnormality consistent with pre-malignant and malignant lesions, as these are quantified in the art. FIG. 21 illustrates an example of this phenomenon by showing the position of nuclei with pre-neoplastic change on a progression curve for bladder cancer varying between "normal" and papillary carcinoma in situ (CIS) of grade 1 lesions. This figure shows that the statistically derived numerical measure of nuclear abnormality used to practice the invention tracks the nuclear-abnormality of cells graded as diseased as a result of visual diagnosis by a pathologist.

Figures 22, 23, 24:
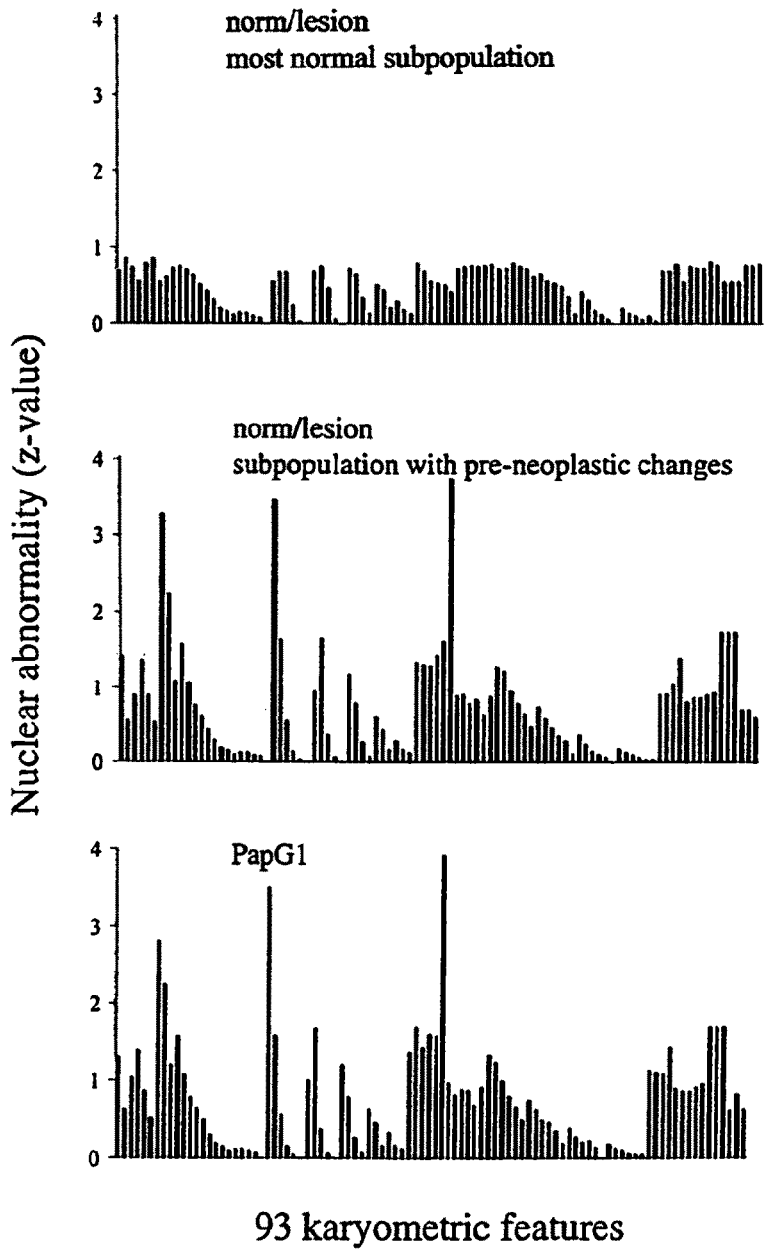
FIG. 22 illustrates the nuclear signature of the most normal subset of urothelial nuclei (normal/lesion $g_1$) in FIG. 21).
FIG. 23 illustrates the nuclear signature of the subset of normal-appearing urothelial nuclei (normal/lesion $g_1$) showing higher deviations from normal than the subset of FIG. 22.
FIG. 24 illustrates the nuclear signature of urothelial nuclei from papillary carcinoma in situ of grade 1, showing essentially the same deviation from normal as the subset of FIG. 23.

FIGS. 22-24 show the heterogeneity of the nuclei measured in the histologically normal-appearing urothelium of FIG. 21. The nuclear signature of FIG. 22 is that of the most normal subset of urothelial nuclei in the cases falling under the label normal/lesion in FIG. 21. (The notation "normal/lesion" is used in the art to label nuclei measured in histologically normal-appearing tissue in an organ harboring a premalignant or a malignant lesion at a different location.) FIG. 23 is the nuclear signature of the about 25% of nuclei showing higher deviations from normal in the normal/lesion data set. This figure shows that the deviations are virtually indistinguishable from those seen in nuclei from grade 1 papillary carcinoma (labeled CA), shown in FIG. 24.

Thus, the invention provides a clearly significant measure of visually undetectable nuclear features that may be extracted from the optical-density information contained in the microscope image of a tissue sample and used to provide an information-enriched image for the pathologist's qualitative assessment of the tissue. This can be done, for example, by associating a given marker to each cell in the image found to correspond to a statistically significant measure of abnormality based on optical-density features. Different colors or computer graphic symbols (at continuous or discrete grading), for instance, may be assigned to all cells falling within a certain range of such measure and the resulting image may be displayed to give the pathologist a picture of which normal-appearing nuclei in fact show signs of statistically significant degradation and the degree of such degradation (as represented by differences in assigned colors or computer-graphic means). The pathologist then, based on his or her experience, may use this new picture of the tissue as further information for a qualitative assessment of the tissue's condition. The new picture with such markers may also be combined with the original image to provide an information-enriched image for diagnostic use by the pathologist. The invention is best illustrated by the following examples.

EXAMPLE 1

Figure 25:
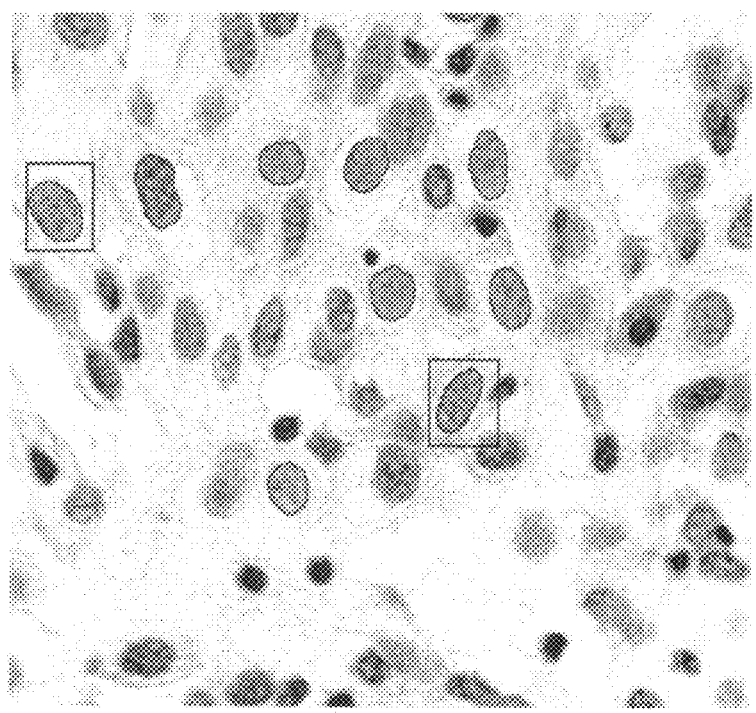
FIG. 25 illustrates the image-enhancing property of the invention in an image of a histopathologic section of urothelium taken from a region judged to be histologically normal at some distance from a papillary carcinoma lesion in a bladder. The framed nuclei have signatures indicating pre-neoplastic change.

FIG. 25 shows a histopathologic section of urothelium taken from a region judged to be histologically normal at some distance from a papillary carcinoma lesion in a bladder. Nine nuclei in the image (identified by highlighted boundaries in the figure) were selected as suitable for analysis for their in-focus position. Upon digital analysis, two of these nuclei showed a nuclear signature resembling that of papillary carcinoma, even though visually the section was normal. Utilizing a computer graphic marker in the form of an outlining box, the diagnostic information is revealed directly on the image, thereby providing a visual, quantitative diagnostic clue not otherwise detectable from the image.

EXAMPLE 2

Figure 26:
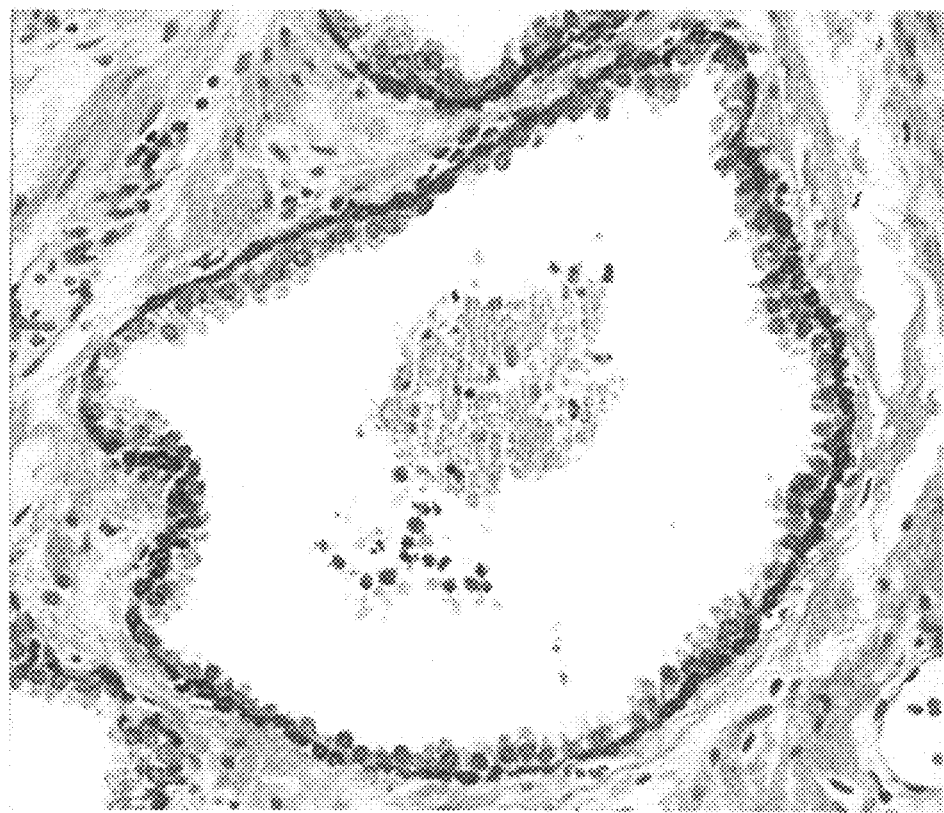
FIG. 26 shows a prostate gland duct that appears normal in view of a visible single-layered epithelium and a basal cell layer without gaps.
Figure 27:
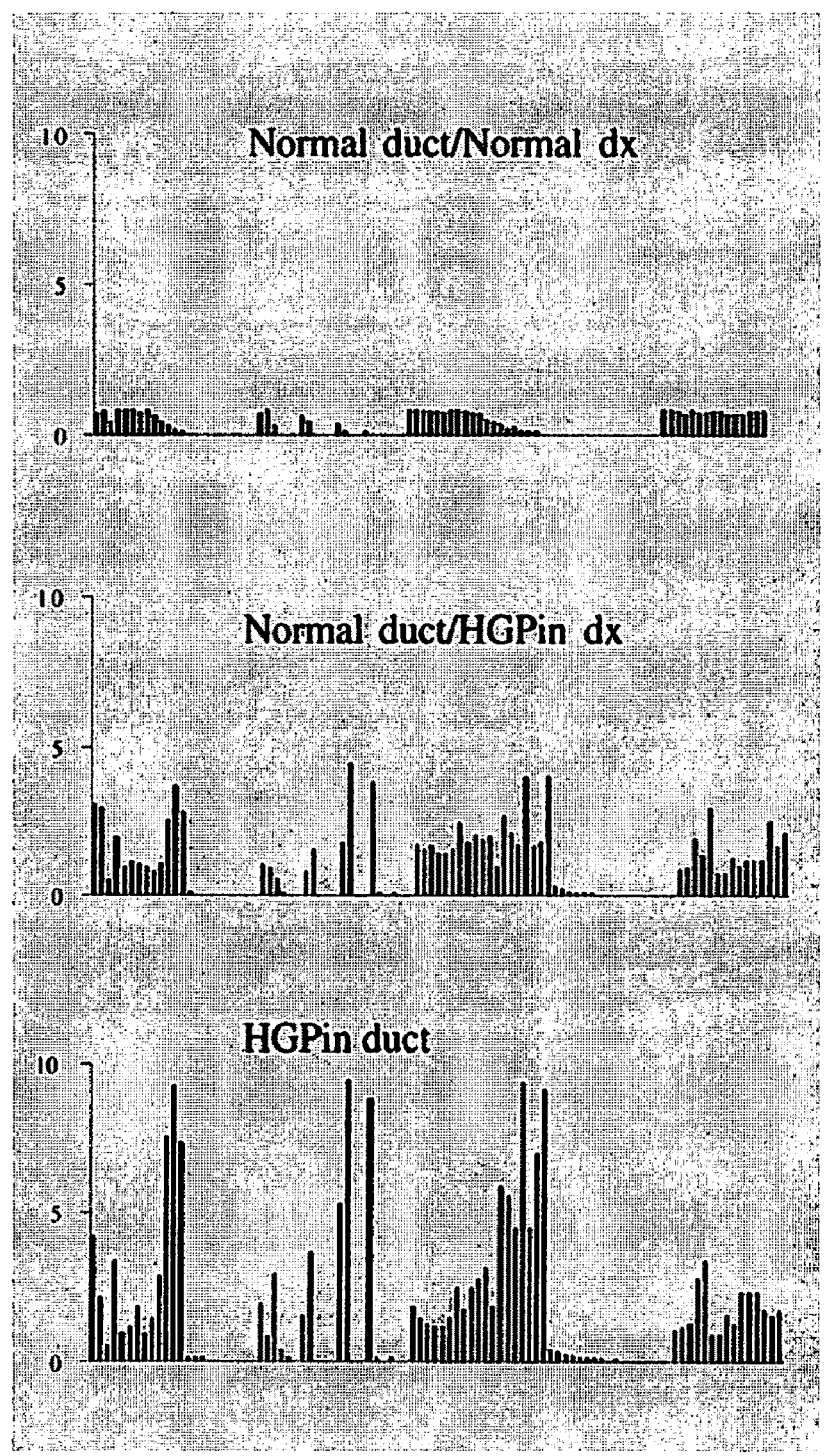
FIG. 27 illustrates the nuclear signature of the nuclei imaged in the sample of FIG. 26 (middle) as compared with the signatures from nuclei of normal tissue (above) and from cancerous tissue (below).

A tissue sample from a prostate gland duct was sectioned, fixed and stained with hematoxylin/eosin. The resulting slide was scanned with a high numerical aperture microscope objective to produce an image of the sample, as shown in FIG. 26. The image exhibits all criteria for a normal gland, such as a single-layered epithelium and a basal cell layer without gaps. However, a numeric analysis of the chromatin pattern of the nuclei revealed an overall signature known to be typical of a "normal appearing gland" in the vicinity of a prostatic intraepithelial neoplasia (PIN) lesion. FIG. 27 illustrates the signature of the imaged sample (seen in the middle of the figure) in comparison with the signatures of normal tissue (above) and cancerous tissue (below).

Figure 28:
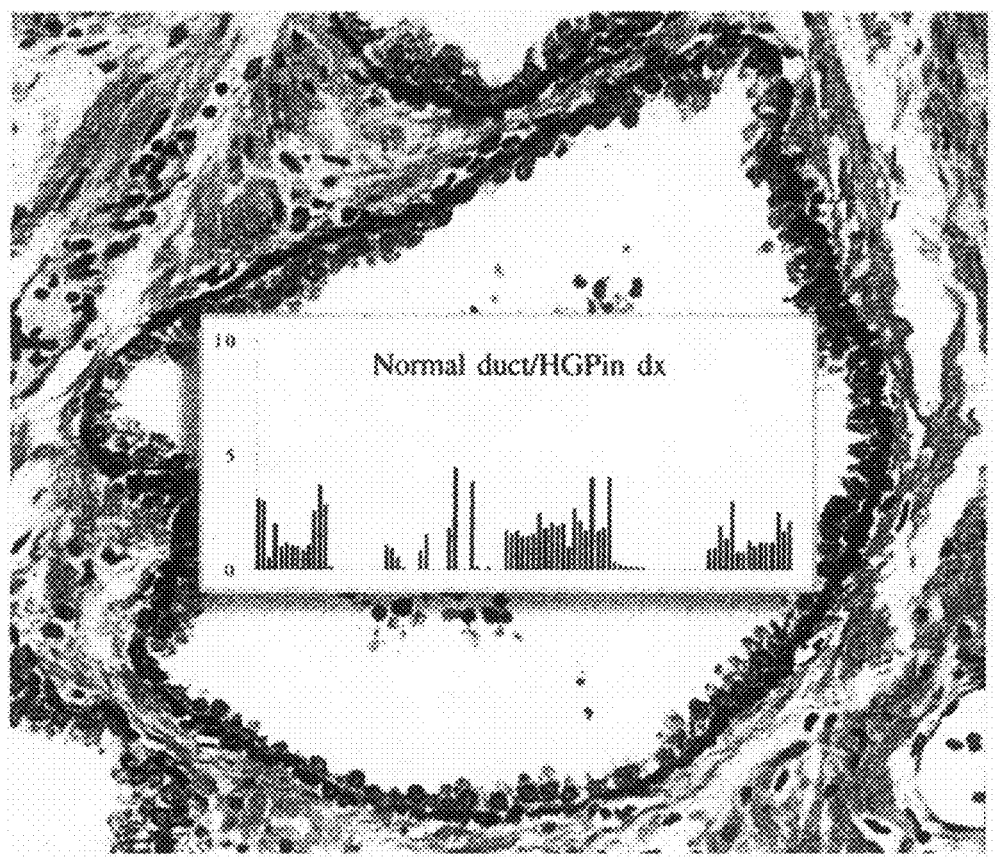
FIG. 28 is the sample of FIG. 26 enriched according to the invention by superimposing the signature corresponding to the sample over the image of the epithelium.
Figure 29:
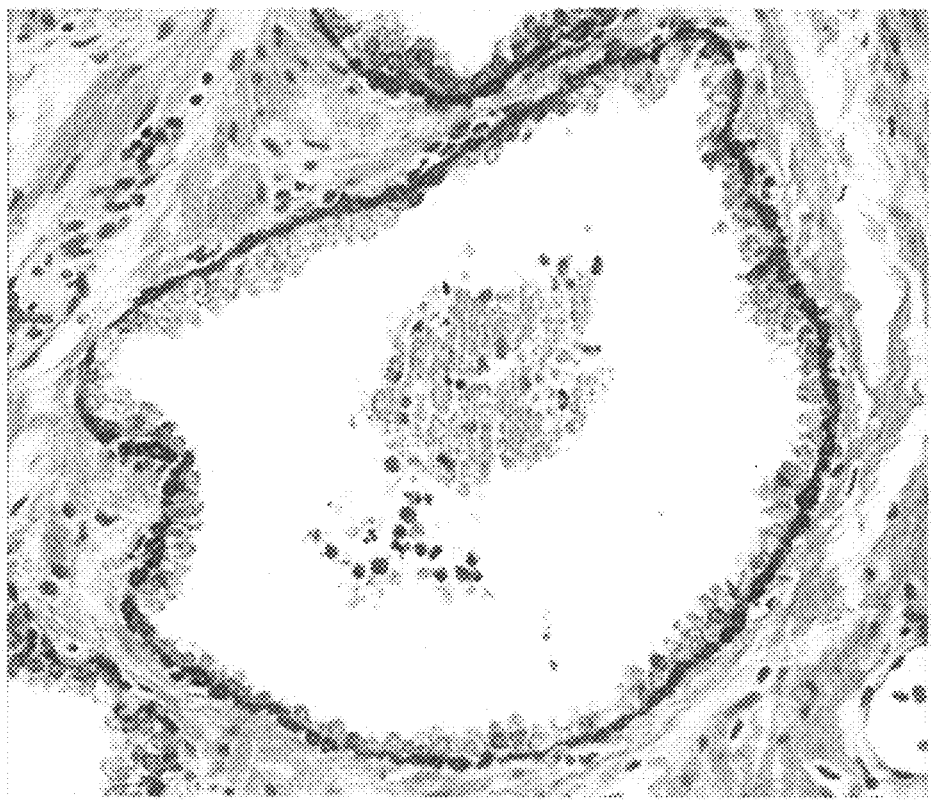
FIG. 29 is the sample of FIG. 26 enriched according to the invention by digitally staining with the colors yellow and green nuclei found to be abnormal and normal, respectively, by numerical analysis and using a predetermined empirical selection criterion.

According to one approach, the signature profile of the epithelium is displayed superimposed on the image of the stained sample to reveal the diagnostic clue that is not otherwise visually perceptible, as illustrated in FIG. 28. According to another, preferred approach, individual nuclei within the epithelium are digitally stained according to the signature profile computed for each nucleus using different colors to separate abnormal nuclei from normal ones according to a predetermined selection criterion. FIG. 29 illustrates this approach where nuclei found to be abnormal by numerical analysis are digitally stained yellow and normal nuclei are stained green.

A comparison of the images produced by the invention with the original images for the same tissue illustrates the additional information available to assist the diagnostic process by a pathologist. While the marked cells are not intended to provide a quantitative result indicative of the tissue condition, the simple existence of the abnormalities reflected by them and the spatial distribution of such abnormalities will provide an additional qualitative tool for the practitioner's consideration while making a diagnostic assessment of the tissue. Thus, the nature of the information produced by the present invention is not to be confused with the quantitative assessments described in the prior art.

Various other changes in the details, steps and components that have been described may be made by those skilled in the art within the principles and scope of the invention herein illustrated and defined in the appended claims. For example, the invention has been described in the context of pathology practice with a conventional transillumination system, wherein a tissue sample is fixed to a slide for staining and microscopic examination by a pathologist. The image normally seen by the pathologist is enhanced as a result of numerical analysis in order to render visible otherwise visually imperceptible information. Clearly, the same inventive concepts can be used with other image-producing techniques, whether based on transmitted, absorbed, or emitted light (such as fluorescence-emission imaging, natural or induced. Similarly, the invention could be carried out with a combination of diagnostic clues obtained from numerical analysis of different kinds of imaging techniques.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method of imaging a biological sample with a microscopic imaging system, comprising the following steps:
provideing a two-dimensional microscope array with a plurality of magnifying imaging systems disposed along a corresponding plurality of optical axes for imaging a sample onto a detector, said plurality of magnifying imaging systems being arranged in rows and configured to image respective sections of the sample;
providing a scanning mechanism for producing a relative movement between the microscope array and the sample;
operating the scanning mechanism along a linear direction of scan across the sample to produce an image of the sample from a plurality of image-forming signals corresponding to said plurality of magnifying imaging systems;
analyzing said plurality of image-forming signals to produce a measure of image-forming features in said image, wherein said measure is a statistically significant indicator of pathology in portions of said image; and
assigning a visually detectable marker to each of said portions of the image corresponding to image-forming signals that produced said measure;
wherein said rows of imaging systems are staggered with respect to said direction of scan, such that each of the magnifying imaging systems acquires image data corresponding to a respective continuous strip of the sample along said linear direction of scan of the scanning mechanism.

2. The method of claim 1, wherein said image-forming signal is optical density.

3. The method of claim 2, further including the step of combining said marker with the image to produce an information-enriched image.

4. The method of claim 3, wherein said marker is color.

5. The method of claim 2, wherein said marker is color.

6. The method of claim 2, wherein said measure is a statistically significant combination of said optical-density features.

7. The method of claim 6, wherein said marker is color.

8. The method of claim 2, wherein said portions of the image are cell nuclei.

9. The method of claim 2, wherein said microscopic imaging system comprises a plurality of individual miniaturized microscopes in an array microscope.

10. An information-enriched image produced by the method of claim 9.

11. An information-enriched image produced by the method of claim 2.

12. Apparatus for imaging a biological sample with a microscopic imaging system, comprising:
a two-dimensional microscope array with a plurality of magnifying imaging systems disposed along a corresponding plurality of optical axes for imaging a sample onto a detector, said plurality of magnifying imaging systems being arranged in rows and configured to image respective sections of the sample;
a scanning mechanism for producing a relative movement between the microscope array and the sample along a linear direction of scan, so as to produce an image of the sample from a plurality of image-forming signals corresponding to said plurality of magnifying imaging systems;
means for analyzing said plurality of image-forming signals to produce a measure of image-forming features in said image, wherein said measure is a statistically significant indicator of pathology in portions of the image; and
means for assigning a visually detectable marker to each of said portions of the image corresponding to image-forming signals that produced said measure;
wherein said rows of magnifying imaging systems are staggered with respect to said direction of scan, such that each of the imaging systems acquires image data corresponding to a respective continuous strip of the sample along said linear direction of scan of the scanning mechanism.

13. The apparatus of claim 12, wherein said image-forming signal is optical density.

14. The apparatus of claim 13, further including means for combining said marker with the image to produce an information-enriched image.

15. The apparatus of claim 14, wherein said marker is color.

16. The apparatus of claim 13, wherein said marker is color.

17. The apparatus of claim 13, wherein said measure is a statistically significant combination of said optical-density features.

18. The apparatus of claim 17, wherein said marker is color.

19. The apparatus of claim 13, wherein said portions of the image are cell nuclei.

20. The apparatus of claim 13, wherein said microscopic imaging system comprises a plurality of individual miniaturized microscopes in an array microscope.

21. An information-enriched image produced by the apparatus of claim 20.

22. An information-enriched image produced by the apparatus of claim 13.

* * * * *